United States Patent

[11] 3,617,408

| [72] | Inventors | Roger D. Hunter;<br>William L. Ripley, both of Bedford, Ind. |
|---|---|---|
| [21] | Appl. No. | 846,944 |
| [22] | Filed | Aug. 1, 1969 |
| [45] | Patented | Nov. 2, 1971 |
| [73] | Assignee | The United States of America as represented by the Secretary of the Navy |

[54] ZIRCONIUM SALT ANTICAKING INGREDIENT FOR NITRATES
3 Claims, No Drawings

[52] U.S. Cl..................................................... 149/46,
149/61, 149/70, 23/102, 23/103
[51] Int. Cl....................................................... C06b 1/04
[50] Field of Search............................................. 23/102,
103; 149/46, 61, 5, 70, 41

[56] References Cited
UNITED STATES PATENTS

| 2,072,719 | 3/1937 | Pearsall........................ | 149/5 X |
| 2,168,030 | 8/1939 | Holmes........................ | 149/5 |
| 2,696,429 | 12/1954 | Hart............................ | 149/5 |
| 2,992,086 | 7/1961 | Porter.......................... | 149/5 |

Primary Examiner—Benjamin R. Padgett
Assistant Examiner—Stephen J. Lechert, Jr.
Attorneys—Edgar J. Brower, H. H. Losche and Paul S. Collignon ABSTRACT: Quadrivalent zirconium is added in small proportions to nitrates, such as sodium nitrate and ammonium nitrate, to prevent caking. A solution of a soluble quadrivalent zirconium salt is added to a nitrate and the quadrivalent zirconium modifies the resultant crystal lattice of the nitrate upon drying to prevent caking of the nitrate during storage.

ZIRCONIUM SALT ANTICAKING INGREDIENT FOR NITRATES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a process and an ingredient for preventing caking of nitrates, such as sodium nitrate and ammonium nitrate, which are to be added as oxidizers for pyrotechnic devices, such as illuminating flares. Sodium nitrate which is used in pyrotechnics is purchased under a military specification which requires an average particle size between 20 and 50 microns. Sodium nitrate which is pulverized to this fineness, however, normally cakes into a hard mass before it can be used, so that it requires an additional grinding operation before being used. Heretofore no anticaking agents could be added because, in order to be effective, from 3—5 percent, by weight, of anticaking agent had to be added and this had a deleterious effect on the candlepower efficiency of illuminating flares.

Various noncaking ingredients have been used in the past, particularly with fertilizers to facilitate their capacity for being scattered. For example, in U.S. Pat. No. 1,966,947, which issued July 17, 1934, to Carl Eyer, it was disclosed that fertilizers containing ammonium nitrate had less tendency to cake when mixed with salts of aluminum or iron. Specifically, the Eyer patent disclosed that fertilizers containing between 1 and 10 percent of either aluminum sulfate or ferric sulfate would have less tendency to cake during storage.

Another anticaking ingredient for fertilizer materials is disclosed in U.S. Pat. No. 3,070,435, which issued Dec. 25, 1962, to Robert E. Reusser and Van C. Vives. This patent discloses that the addition of between 0.75 and 3 percent by weight of anhydrous magnesium sulfate will prevent fertilizers containing ammonium nitrate from caking.

SUMMARY OF THE INVENTION

The present invention relates to an improved process and ingredient for preventing the caking of nitrates, such as sodium nitrate and ammonium nitrate. A soluble salt of quadrivalent zirconium is dissolved in water and mixed with a nitrate, such as sodium nitrate and ammonium nitrate. The quadrivalent zirconium modifies the resultant crystal lattice of the nitrate upon drying and the nitrate will not cake during storage. The percentage of zirconium required to prevent caking is extremely low, being in the range of 0.16 to 0.80 percent, by weight, and thus there is only a slight reduction of candlepower efficiency in illuminating flares which use a nitrate having this anticaking ingredient.

DESCRIPTION OF THE PREFERRED EMBODIMENT

According to the present invention, it has been found that quadrivalent zirconium will modify the crystal lattice of both sodium nitrate and ammonium nitrate and, when so modified, these nitrates will no longer tend to cake while in storage. A solution is made using a soluble salt of zirconium and then the nitrate is added. Upon drying, the crystal lattice is modified. Satisfactory end results, that is, noncaking nitrates, have been achieved using zirconium acetate, zirconium nitrate, zirconium oxychloride, zirconium sulfate and zirconium tetrachloride. When insoluble zirconium oxide was used, no anticaking effect was achieved.

Sodium nitrate has been combined with zirconium to provide a free-flowing powder after it is pulverized. For example, satisfactory results have been obtained using zirconium sulfate concentration of between 0.16 and 0.80 percent, by weight, that is, 0.20 to 1.0 percent as $Zr(SO_4)_2 \cdot 4H_2O$. The sodium nitrate is precipitated or crystallized from the zirconium sulfate solution. On drying, the sodium nitrate contaminated with zirconium sulfate formed a growth on the surface. Chemical analysis showed the presence of about 0.15 percent zirconium, and X-ray diffraction studies revealed no differences in the pattern of the zirconium-sulfate-doped sodium nitrate and a control sodium nitrate. Differential thermal analysis, however, showed a very large endotherm at 150° C. The dried and ground material had a dull, chalky appearance and formed no lumps after standing for 6 months. It remained free flowing and powdery.

Experimental illuminating flares were made using the zirconium-doped sodium nitrate and these were compared with control candles. A typical formulation for an illuminating candle might be that of about 58 percent of granulated magnesium, about 37.5 percent of sodium nitrate and about 4.5 percent of a binder. The average burning time of four control flares was about 190 seconds with an average candlepower of 1,900,000. The candlepower efficiency was 53,000 cp.-sec./g. The average burning time of four experimental candles made with zirconium-sulfate-doped sodium nitrate was 164 seconds with an average candlepower of 1,964,000. The candlepower efficiency was 49,000 cp.-sec./g. Thus, although the efficiency of a flare using the improved sodium nitrate is lower than that of a flare using untreated sodium nitrate, the reduction is so low that it will not preclude the use of treated sodium sulfate in military flares, as the advantage of having a noncaking nitrate more than compensates for the slight reduction in efficiency of an illuminating flare. Quadrivalent zirconium also has an anticaking affect when employed with ammonium nitrate.

We claim:

1. A method for reducing the caking tendency of a nitrate selected from the group consisting of sodium nitrate and ammonium nitrate comprising adding a solution of a zirconium salt selected from the group consisting of zirconium acetate, zirconium nitrate, zirconium oxychloride, zirconium sulfate, and zirconium tetrachloride to modify the resultant crystal lattice of said nitrate upon drying.

2. An oxidizing material having reduced tendency to cake comprising, a nitrate selected from the group consisting of sodium nitrate and ammonium nitrate, and a soluble salt of quadrivalent zirconium selected from the group consisting of zirconium acetate, zirconium nitrate, zirconium oxychloride, zirconium sulfate, and zirconium tetrachloride.

3. An oxidizing material having reduced tendency to cake as set forth in claim 3 wherein the amount of quadrivalent zirconium is in the range of 0.16 to 0.08 percent, by weight, of the oxidizing material.

* * * * *